US 6,647,730 B2

(12) United States Patent
Liu

(10) Patent No.: US 6,647,730 B2
(45) Date of Patent: Nov. 18, 2003

(54) TURBINE ENGINE HAVING TURBINE COOLED WITH DIVERTED COMPRESSOR INTERMEDIATE PRESSURE AIR

(75) Inventor: Xiaoliu Liu, Mississauga (CA)

(73) Assignee: Pratt & Whitney Canada Corp., Quebec (CA)

( * ) Notice: Subject to any disclaimer, the term of this patent is extended or adjusted under 35 U.S.C. 154(b) by 0 days.

(21) Appl. No.: 10/000,403

(22) Filed: Oct. 31, 2001

(65) Prior Publication Data

US 2003/0079477 A1 May 1, 2003

(51) Int. Cl.[7] .................................................. F01D 1/24
(52) U.S. Cl. .......................... 60/782; 415/116; 415/60; 416/95
(58) Field of Search ............................ 415/60, 115, 116, 415/117; 416/95, 96 V, 97 V; 60/782, 805, 806

(56) References Cited

U.S. PATENT DOCUMENTS

| | | | |
|---|---|---|---|
| 2,812,897 A | * 11/1957 | Cameron | ...................... 230/116 |
| 3,034,298 A | * 5/1962 | White | ......................... 60/39.66 |
| 3,240,012 A | * 3/1966 | Price | .......................... 60/39.23 |
| 4,302,148 A | * 11/1981 | Tubbs | ......................... 415/115 |
| 4,761,947 A | 8/1988 | Hennecke et al. | |
| 5,555,721 A | 9/1996 | Bourneuf et al. | |
| 5,862,666 A | 1/1999 | Liu | |
| 6,227,801 B1 | * 5/2001 | Liu | .............................. 415/117 |
| 6,487,863 B1 | * 12/2002 | Chen et al. | .................... 60/782 |

FOREIGN PATENT DOCUMENTS

| EP | 1033484 | 9/2000 |
|---|---|---|
| GB | 2075123 | 11/1981 |

* cited by examiner

Primary Examiner—Charles G. Freay
Assistant Examiner—John F. Belena
(74) Attorney, Agent, or Firm—Bachman & LaPointe, P.C.

(57) ABSTRACT

In a turbine engine, low temperature air is diverted from a low pressure section of the compressor section of the engine to cool the high pressure turbine of the engine. Low pressure air is diverted from the compressor section, and its pressure is thereafter increased. Preferably, the pressure is increased in an intermediate cavity in the engine, where rotational energy of the diverted air is converted to static pressure by way of an obstruction that converts dynamic head of the air in the cavity into static pressure.

20 Claims, 3 Drawing Sheets

TURBINE ENGINE HAVING TURBINE COOLED WITH DIVERTED COMPRESSOR INTERMEDIATE PRESSURE AIR

FIELD OF THE INVENTION

The present invention relates to turbine engines, and more particularly to turbine engines having turbine blades cooled using diverted air.

BACKGROUND OF THE INVENTION

Turbine engines, such as those used as aircraft turbojets or turbofans typically include from front to rear, in the direction of fluid flow in the engine, fan, compressor, combustion and turbine sections within a housing. These sections include rotating components mounted on one or more coaxial shafts for rotation about a central axis of the engine.

The fan section draws air into the engine. It is compressed in the compressor section, and admixed with fuel in the combustion section where the mixture is ignited. Combustion gases exit the combustion section and drive one or more turbines within the turbine section.

Typically a first stage, high pressure turbine ("HPT") blade is cooled to prevent melting by using uncombusted high pressure air, referred to as "P3" air. Specifically, the P3 air is passed through a tangential on-board injector ("TOBI") nozzle. This TOBI nozzle reduces the relative total temperature of the P3 air, typically by approximately 100° F. (55° C.). The reduced temperature P3 air is passed into a HPT disk/coverplate and through the HPT blade. There, the P3 air cools the HPT blade using, typically using showerhead cooling.

It has however been recognized that the use of high pressure P3 air is thermodynamically inefficient and that a TOBI and ancillary components add weight and complexity to the engine.

As a result, U.S. Pat. No. 6,227,801, the contents of which are hereby incorporated by reference, discloses an improved turbine engine that diverts lower pressure P2x air, at a lower temperature from the compressor section of a turbine engine, upstream of the compressor section's high pressure (P3) outlet. In order to be effective, however, the P2x air is diverted from a region of the compressor having a pressure higher than the static pressure at the HPT blade. This typically requires that P2x air is diverted after being compressed and heated, as a result of this compression.

Accordingly, an improved method of diverting air for HPT cooling, at reduced temperatures and pressures would be desirable. Moreover, an engine with reduced weight of components associated with HPT cooling is desirable.

SUMMARY OF THE INVENTION

It is therefore an object of the present invention to provide an improved turbine engine, in which low temperature air is diverted from a low pressure section of the compressor section of the engine to cool the HPT of the engine. Advantageously, low pressure air is diverted from the compressor section, and its pressure may thereafter be increased. Preferably, the pressure is increased in an intermediate cavity, where rotational energy of the diverted air is converted to static pressure. This may be accomplished by an obstruction within the cavity that converts dynamic head of the air resulting from its tangential velocity in the cavity into static pressure.

In accordance with an aspect of the present invention, a turbine engine includes a compressor section for compressing intake air into high pressure air and intermediate pressure air; a combustion section in flow communication with the cornpressor section, for combusting fuel with compressed air; and a turbine section in flow communication with combustion gases from the combustion section, the turbine section comprising a turbine blade having a tip at lower pressure than the intermediate pressure air. A generally annular cavity upstream of the compressor section includes a bleed in flow communication with the with the intermediate pressure air, and an obstruction within the cavity for converting dynamic head of the intermediate pressure air to increase static pressure of the intermediate pressure air. A conduit having an inlet in flow communication with the cavity and an outlet in flow communication with the turbine blade guides the intermediate pressure air at the increased pressure over the turbine blade.

In accordance with another aspect of the present invention, components within a turbine engine that includes a compressor section, a combustion section, and a turbine section in flow communication are cooled. The method includes (i) diverting intermediate pressure air having a temperature lower than highest pressure air entering the combustion section, from the compressor section; (ii) increasing pressure of the diverted intermediate pressure air to exceed the static pressure of a rotating turbine blade within the turbine section; and (iii) guiding the intermediate pressure air at its increased pressure to the rotating turbine blade to cool the turbine blade.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which will illustrate embodiments of the invention.

DETAILED DESCRIPTION

Figure 1:
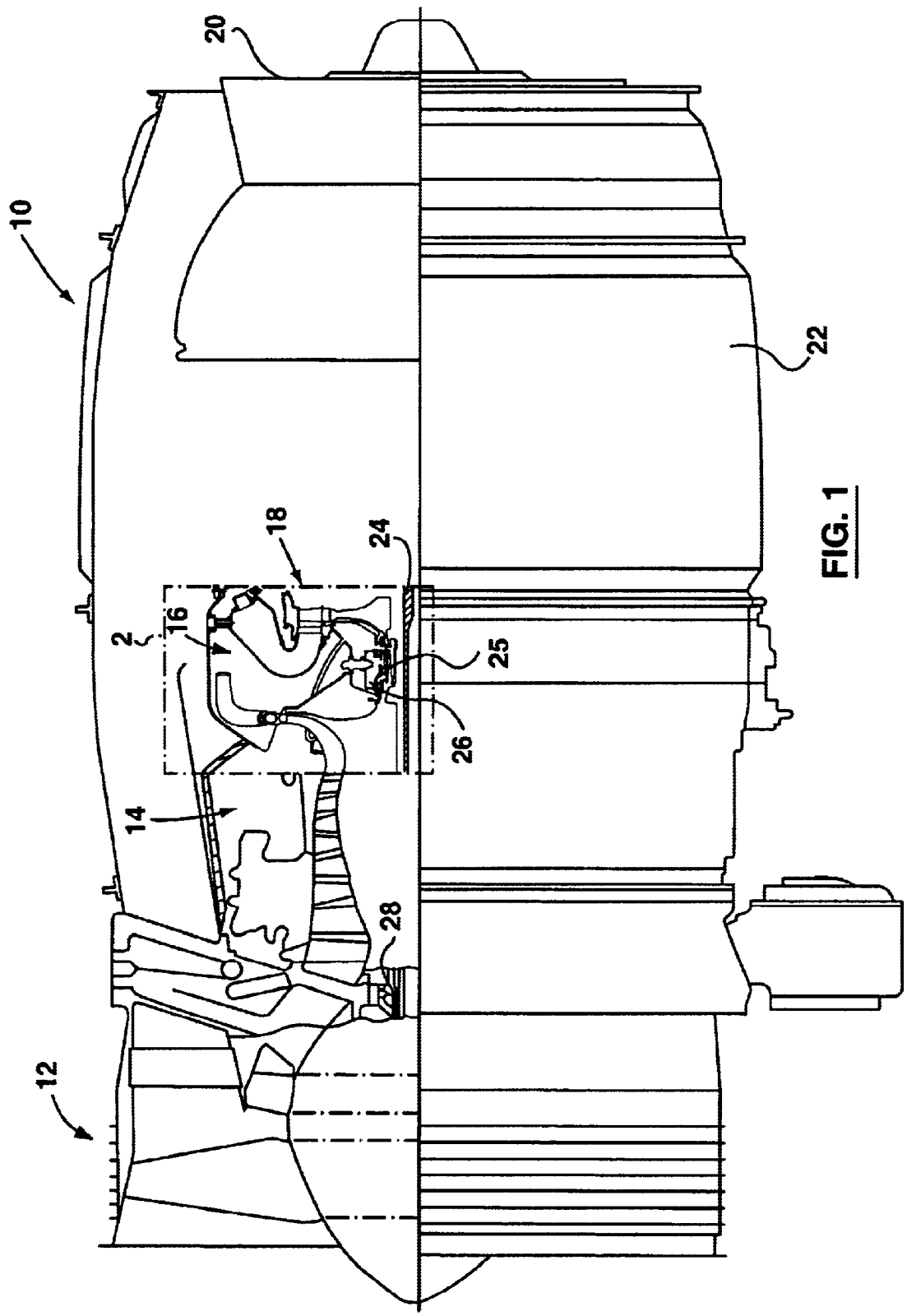
FIG. 1 is a side plan view of a turbine engine, exemplary of an embodiment of the present invention.

FIG. 1 illustrates a gas turbine engine 10, exemplary of an embodiment of the present invention. Engine 10 includes a fan section 12, and a core engine which includes, in flow series, a compressor section 14; a combustion section 16; a turbine section 18; and an exhaust section 20 all mounted within an engine housing 22.

Compressor section 14 includes multiple stages. Turbine section 18 preferably includes only a single stage, high work turbine. However, turbine section 18 may include multiple turbine stages. At least one turbine within the turbine section 18 is rotationally coupled to the final stage of compressor section 14 by a shaft 24. Shaft 24 is supported within housing 22 near its rear by a roller bearing assembly 25 and near its front by thrust bearing assembly 26.

Figure 2:
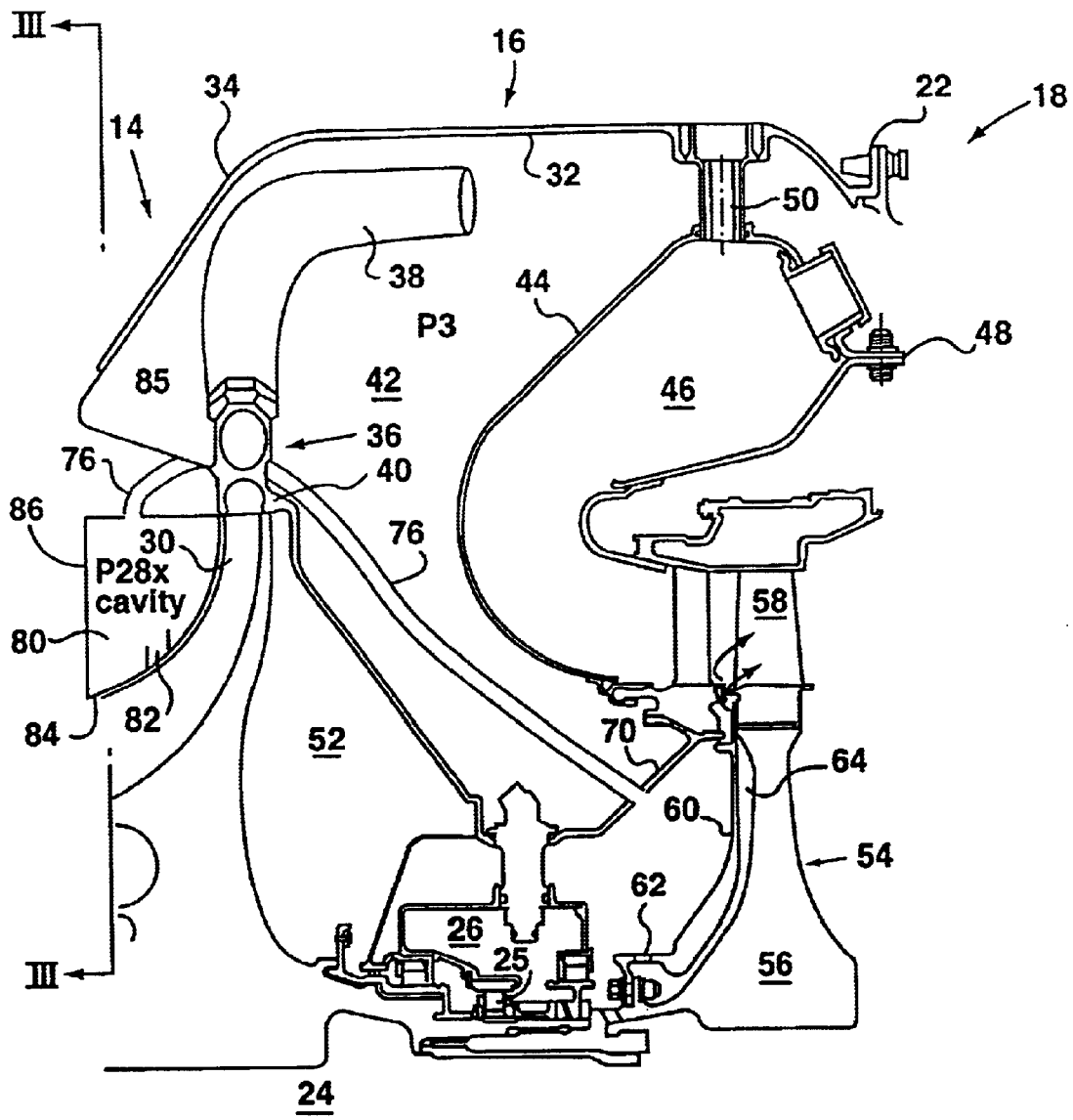
FIG. 2 is an enlarged cross-sectional view of a portion of FIG. 1.

FIG. 2 illustrates, in cross section, a portion of turbine engine 10, near the rear of compressor section 14 and the front of combustion section 14. As illustrated, the final stage of the compressor section 14 is preferably a rotating impeller 30 in flow communication with combustion section 16.

Combustion section 16 is formed on either side by combustor case 32 and diffuser case 34 forming part of a diffuser assembly 36. Diffuser assembly 36 further includes diffuser pipe 38 and support 40. Highest pressure P3 air exits diffuser pipe 38.

Diffuser pipe 38 is located within combustion section 16, and provides flow communication between the tip of impeller 30 and combustion section 16, guiding P3 gases from impeller 30 to a P3 region 42 of combustion section 16. As understood by those skilled in the art, and as detailed in U.S. Pat. No. 5,862,666, diffuser pipe 38 serves primarily to reduce the tangential velocity of air exiting impeller 30.

Additionally, within combustion section 16 is combustor liner 44 defining combustion chamber 46 mounted to the engine housing 22 by case support 48. Combustion chamber 46 is in flow communication with high pressure region 50 of combustion section 42. Also in flow communication with combustion chamber 46 is fuel nozzle 50.

Turbine section 18 includes high pressure turbine 54, which in turn includes a rotor 56 and blade 58. Blade 58 is preferably the first blade within turbine section 18 in flow communication with gases from the combustion section, and is thus in flow communication with some of the hottest gases within engine 10. A cover plate 60 shields the cooling air from possible hot gas ingestion and defines a rotating cavity 64. Holes 62 in cover plate 60 provide a conduit between combustion section 16 and rotor 56.

Figure 3:
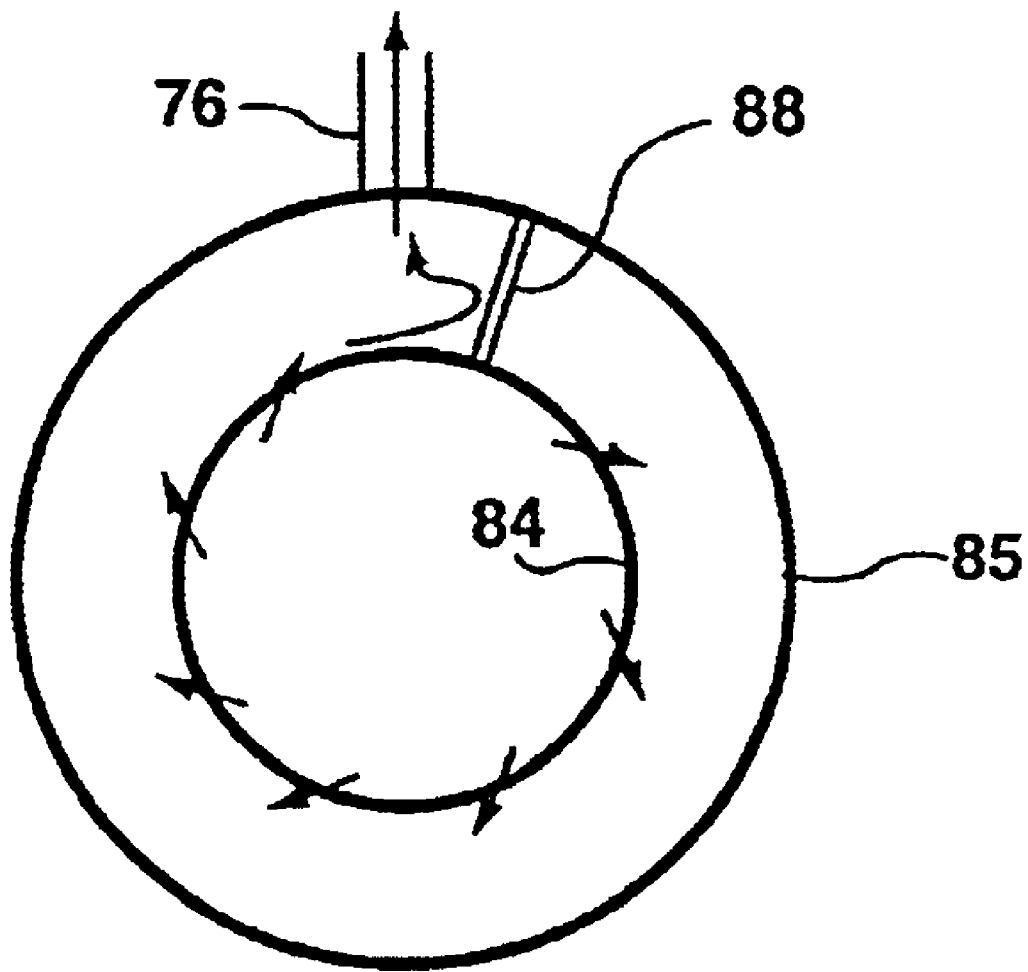
FIG. 3 is a front cross-sectional view of FIG. 2, along III—III.

Conduit 76 extends from an intermediate pressure cavity 80, located upstream of the output of impeller 30. Example cavity 80 is often referred to as a "P28x" cavity. Cavity 80 is shown in front view in FIG. 3. A bleed 82 emanates from a region of intermediate pressure air of compressor section 14 and bleeds intermediate pressure air from compressor section 14 into cavity 80. Specifically, exemplary cavity 80 is formed by three spaced annular walls 84, 85 and 86. Accordingly, cavity 80 may be described as generally torroidal in shape, having a uniform cross-section as illustrated in FIG. 2, and a generally annular cross section along lines III—III of FIG. 1, as illustrated in FIG. 3. Bleed 82 is a generally circumferential slot formed within inner wall 84, and located upstream of the output of impeller 30. A further obstruction 88 in the form of a dividing wall (FIG. 3), extends generally radially within cavity 80, and prevents circulation of bled air within cavity 80, around the central axis of engine 10. The inlet of a conduit 76 is in flow communication with the interior of cavity 80, and extends from outer wall 85, just upstream of obstruction 88.

In operation, fan section 12 (FIG. 1) draws air into engine 10. The air passes from fan section 12 to compressor section 14, where it is compressed by the multiple compressor stages. The final stage of compression is impeller 30, illustrated in FIG. 2. High pressure (P3) air leaves the tip of impeller 30. The majority of this high pressure air is directed to combustion section 14 by diffuser pipe 38. There, much of the P3 air enters chamber 46 and is mixed with fuel from nozzle 50 and combusted. Combusted gases leave chamber 46, near its rear and pass over HPT blade 58.

In a conventional turbine engine, blade 58 would be cooled by P3 gases directed over the rear cover of turbine casing 56, injected by way of a TOBI (not shown), as more particularly described in U.S. Pat. No. 6,227,801. Cooling shower heads on the turbine blade could then disperse the injected air over the blade to keep the blade from melting.

However, exemplary of the present invention and as illustrated in FIG. 2, conduit 76, preferably in the form of metal piping directs bleed (known as P2x air) air from a cavity 80 and thus a lower pressure region of impeller 30, through HPT blade 58 by way of its leading edge. Specifically an inlet of conduit 76 directs air from cavity 80 to an output interconnected with baffle 70. Baffle 70 and cover plate 60 define a region just upstream of cover plate 60. Air from this region is guided through holes 62, into cavity 64, in front of rotor 56, and through HPT blade 58 as illustrated. This is possible largely because the leading edge of HPT blade 58 is at a lower pressure than P3 region and mores significantly, than P2x air within cavity 80. Conveniently, cavity 80 increases the static pressure of diverted P2x air bled from compressor section 14. Specifically, as illustrated in FIG. 3, air bled into cavity 80 that would normally circulate about the axis of engine 10 is halted by obstruction 88. As a result, the dynamic head associated with the rotational energy of the bled air (i.e. due to its tangential velocity) is converted to an increase of the static pressure within cavity 80. Preferably, the inlet to conduit 76 is proximate obstruction 88, where the static pressure is highest.

Conveniently, then the increase in static pressure produced by cavity 80 allows air to be bled from a lower temperature region of compressor section 14. It is estimated that the presence of obstruction 88 increases the static pressure within cavity by about 30%. Moreover, such an increase in pressure in the absence of obstruction 88 could be achieved by moving bleed 82 axially forward to a region of compressor section 14 where the temperature of compressed air could be about 100° F. (55° C.) higher. As should now be appreciated, P2x air may now be bled from a region of compressor section 14 having a static pressure that is not materially higher than the static pressure of the leading edge of HPT blade 58. In fact, air having a static pressure that is lower than the static pressure of the leading edge of HPT blade 58 may be bled from compressor section 14. The pressure of this bled air may then be increased by obstruction 88.

Advantageously, bled P2x air is "thermodynamically cheaper" than P3 air. Its pressure is lower, and more advantageously, P2x air is at a lower temperature than P3 air in region 50. The lower the pressure of the bled P2x air, the lower its temperature. Consequently, the use of P2x air, and the resulting decrease in the use of P3 air in cooling the HPT blade 58 improves overall engine efficiency. Moreover, the lower the pressure of the bled air, the less energy is expended on this air, and the greater the efficiency of overall engine operation.

More significantly, as the P2x air is lower in temperature than P3 air, showerheads formed as part of conventional HPT blades may be eliminated and the use of a conventional TOBI nozzle that primarily serves to reduce the P3 air temperature may also be eliminated. Using lower pressure P2x air and eliminating the showerheads, the required blade feed pressure is reduced. This, in turn, allows for the elimination of conventional brush seals. Additionally, the P2x guided by conduit 76 may also be directed to rear bearing cavity 25, by eliminating a convention baffle. These and other benefits of diverting lower pressure air from compressor section 14 are detailed in as detailed in U.S. Pat. No. 6,227,801.

Further, the diverted P2x air may also be directed to the shaft 20 instead of P3 air. Because the P2x air is much cooler, shaft 24 may be made of steel instead of a temperature resistant alloy such as INCONEL™, which leads to cost reduction in engine construction.

As should now be apparent, cavity 80 may be formed in any number of ways so that it acts to increase static pressure of bled air. For example, the cross-section of cavity 80 may be almost any suitable shape. Moreover obstruction 88 need not be formed as a partition wall, nor need it extend radially. Any suitable obstruction within cavity 80 that serves to increase the static pressure of air bled from compressor section 14 may be used to form obstruction 88. Similarly, although inlet to conduit 76 is preferably located proximate obstruction 88, it could be located in another suitable location on in communication with the interior of cavity 80.

It will be further understood that the invention is not limited to the illustrations described herein which are merely illustrative of a preferred embodiment of carrying out the invention, and which are susceptible to modification of form, size, arrangement of parts and details of operation. The invention may easily implemented to modify existing engine designs other than the representative engine, described above. The invention, rather, is intended to encompass all such modifications within its scope, as defined by the claims.

What is claimed is:

1. A turbine engine comprising:
   a compressor section for compressing intake air into high pressure air and intermediate pressure air;
   a combustion section in flow communication with said compressor section, for combusting fuel with compressed air;
   a turbine section in flow communication with combustion gases from said combustion section, said turbine section comprising a turbine blade having a tip;
   a generally annular cavity upstream of an exit of said compressor section comprising a bleed in flow communication with said intermediate pressure air such that said intermediate pressure air is delivered to said cavity with a dynamic head of pressure due in substantial part to a rotation of said intermediate air, and an obstruction within said cavity for converting said dynamic head of said intermediate pressure air to increase static pressure of said intermediate pressure air; and
   a conduit having an inlet in flow communication with said cavity and an outlet in flow communication with said turbine blade, thereby guiding said intermediate pressure air at said increased pressure over said turbine blade.

2. The turbine engine of claim 1, wherein said obstruction comprises a wall extending in a direction generally radial to a central axis of said engine.

3. The turbine engine of claim 1, wherein said blade comprises a leading edge and said intermediate pressure air is at a static pressure less than or only slightly greater than static pressure proximate said leading edge.

4. The turbine engine of claim 1, wherein said conduit comprises a pipe.

5. The turbine engine of claim 1, wherein said turbine blade does not comprise a shower head cooling assembly.

6. The turbine engine of claim 1, wherein said conduit provides a primary source of cooling air to said turbine blade.

7. A method of cooling components within a turbine engine, said turbine engine comprising a compressor section, a combustion section, and a turbine section in flow communication said method comprising:
   diverting from said compressor section rotating intermediate pressure air having a temperature lower than highest pressure air entering said combustion section from said compressor section;
   increasing static pressure of said diverted rotating intermediate pressure air to exceed a static pressure of combustion gases adjacent a rotating turbine blade within said turbine section, and
   guiding said intermediate pressure air at said increased pressure to said rotating turbine blade to cool said turbine blade.

8. The method of claim 7, wherein said increasing comprises bleeding said intermediate pressure air into a cavity, and converting rotational energy of said intermediate pressure air to increase static pressure thereof.

9. The method of claim 8, wherein a leading edge of said turbine blade is at a lower static pressure than the pressure of said intermediate pressure air, after said increasing.

10. The method of claim 7, wherein said guiding comprises guiding intermediate pressure air over a high pressure turbine blade.

11. A turbine engine comprising:
    means for compressing intake air into high pressure air and intermediate pressure air;
    means for combusting fuel admixed with compressed air from said means for compressing;
    a turbine section in flow communication with combustion gases from said means for combusting, said turbine section comprising a turbine blade;
    means for bleeding said intermediate pressure air from said means for compressing while substantially preserving a rotational flow of said intermediate pressure air;
    means for increasing static pressure of said intermediate pressure air above a static pressure at said turbine blade;
    means for guiding said intermediate pressure air at an increased static pressure, from said means for increasing to said turbine blade, thereby cooling said turbine blade.

12. The turbine engine of claim 1, wherein said conduit inlet is adjacent said obstruction.

13. A method of cooling at least one component within a gas turbine engine, said turbine engine comprising a compressor section, a combustion section, and a turbine section in flow communication, the compressor section having a central axis or rotation, said method comprising:
    diverting an air flow from the compressor section at a location upstream of a compressor section exit, the air flow being diverted in a manner which at least partially preserves a rotational circulation of said diverted air flow around the compressor central axis;
    disrupting said rotational circulation of said diverted flow, thereby causing a pre-determined increase in a static pressure in the diverted air; and
    delivering the diverted air to cool said at least one component.

14. The method of cooling of claim 13, wherein said pre-determined static pressure increase is sufficient to cause the diverted air to have a static pressure greater than a static air pressure in a vicinity of said at least one component.

15. A gas turbine engine comprising:
    a compressor section for compressing air, the compressor section having a casing and an exit;
    a combustion section in flow communication with said compressor section exit;
    a turbine section in flow communication with said combustion section;
    a generally annular cavity;
    at least one slot in the compressor section casing upstream of the compressor section exit adapted to bleed rotating air at a first static pressure from the compressor section into said cavity, the at least one slot adapted to permit a rotational component of said bled air entering said cavity to be maintained;

an obstruction within the cavity adapted to impede said rotational component of said bled air to thereby increase said bled air to a second static pressure; and a conduit adapted to deliver said bled air at said second static pressure from said cavity to said turbine for cooling of said turbine.

16. The gas turbine engine of claim 15, wherein said first static pressure is not greater than a static pressure at an outlet of said conduit.

17. The gas turbine engine of claim 15, wherein said at least one slot directly communicates with said cavity.

18. The gas turbine engine of claim 15, wherein said obstruction comprises a member extending in a direction generally radial to a central axis of said engine.

19. The gas turbine engine of claim 15, wherein said conduit provides a primary source of cooling air to said turbine.

20. The gas turbine engine of claim 15, wherein said second static pressure is about 30% higher than said first static pressure.

* * * * *